Jan. 24, 1961  E. T. NESTER  2,968,839
VALVE STEM ADJUSTER FOR CURING RIM
Filed May 11, 1959
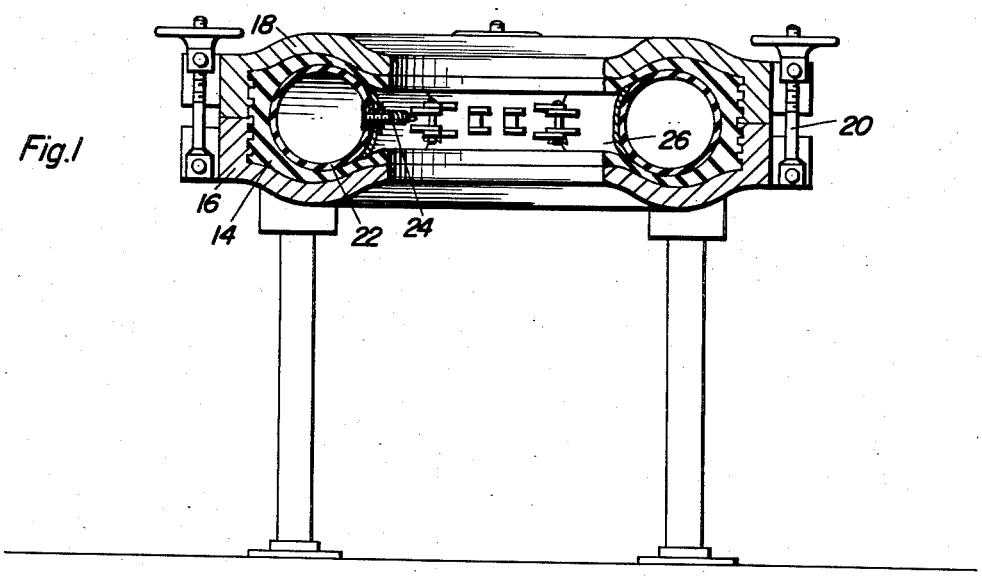
Fig./
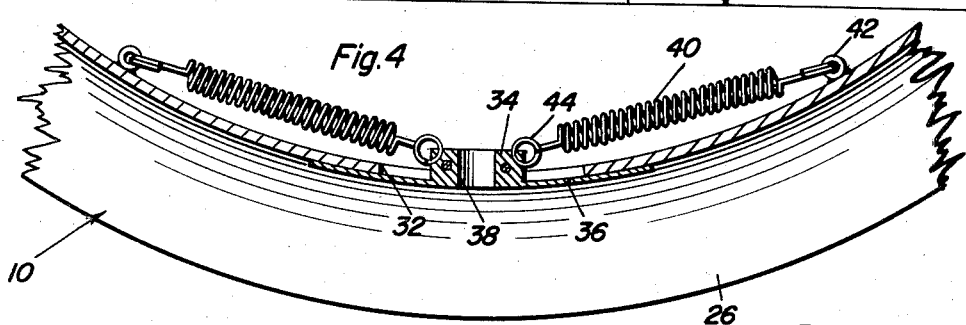
Fig.4
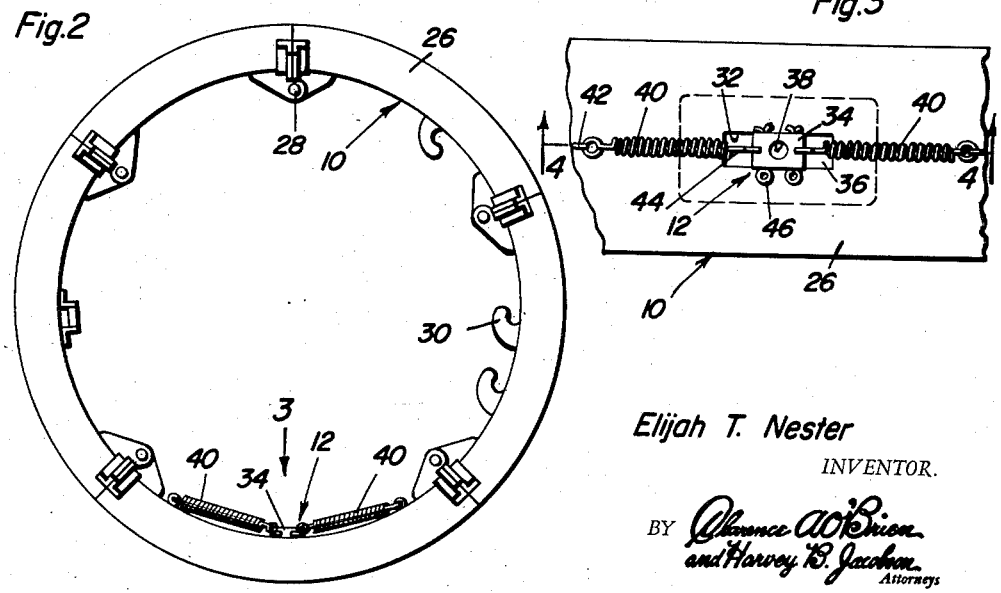
Fig.2
Fig.3
Elijah T. Nester
INVENTOR.
BY *Clarence A. O'Brien*
and *Harvey B. Jacobson*
Attorneys United States Patent Office 2,968,839
Patented Jan. 24, 1961

2,968,839

VALVE STEM ADJUSTER FOR CURING RIM

Elijah T. Nester, P.O. Box 722, Radford, Va.

Filed May 11, 1959, Ser. No. 812,353

4 Claims. (Cl. 18—45)

This invention relates to a valve stem adjusting mechanism and more particularly to a rim construction having a movable valve stem receiving element therein which element is spring biased to a neutral position but is movable to a position for automatically adjusting itself to receive the valve stem so that the valve stem will not be torn loose from the inflatable member to which it is attached.

In the recapping of a tire, a curing bag is used inside of the tire with there being a rim engaging the curing bag for retaining the same within the tire. Air pressure of 140 to 175 pounds per square inch is used in the curing bag thus necessitating that the curing rim be in perfect alignment with the curing bag stem or else the valve stem will be turn loose from the curing bag. Under present practices, considerable time and labor are consumed in aligning the valve stem with the valve stem opening in the rim. The curing rim must either be taken down, that is disassembled in order to make the alignment or it it is not taken down, the curing rim is usually struck with an impact instrument such as a hammer or the like for moving the rim so that the valve stem opening therein is in alignment with the valve stem in the curing bag. This procedure not only requires a considerable amount of time but also requires an extensive amount of labor and quite often results in damage to the equipment. Therefore, it is the primary object of the present invention to provide a valve stem adjuster in the form of a structural modification of the curing rim which broadly includes the provision of an elongated slot in the curing rim having a slidable element which is apertured to receive a valve stem received in the slot and disposed in centralized position with spring means being provided for retaining the adjuster in centralized position.

Another object of the present invention is to provide a valve stem adjuster primarily constructed for use with curing rims but which may be used for rims on trucks, tractors or other heavy equipment where the innertube valve stem is quite difficult to align with the valve stem opening in such rims.

A still further object of the present invention is to provide a valve stem adjuster which is extremely simple in construction, easy to use, effective for its particular purposes and relatively inexpensive to manufacture.

These together with other objects and advantages which will become subsequently apparent reside in the details of construction and operation as more fully hereinafter described and claimed, reference being had to the accompanying drawing forming a part hereof, wherein like numerals refer to like parts throughout, and in which:

Figure 1 is a transverse sectional view of the curing rim in assembled relation to the curing bag, tire and mold;

Figure 2 is a plan view of the curing rim;

Figure 3 is an elevational view of the valve stem adjuster as viewed in the direction of the numbered arrow in Figure 2;

Figure 4 is a longitudinal sectional view taken substantially upon a plane passing along section line 4—4 of Figure 3 illustrating the details of construction of the adjuster on an enlarged scale.

Referring now specifically to the drawings, the numeral 10 generally designates the curing rim having the valve stem adjuster generally designated by the numeral 12 incorporated therein. In Figure 1, the curing rim 10 is illustrated in assembled relation to a tire casing 14 disposed within a conventional two-part mold 16 and 18 in which the two parts are held together by suitable retaining means 20 and these molds may have the usual matrices therein along with conduits for heating fluid which structure is not shown. Disposed within the tire casing 14 is a curing bag 22 of heavy duty construction which receives air pressure through a valve stem 24 which extends out through the rim 10. The curing rim 10 contacts the bag and is pressed inside the tire between the two adjacent beads to maintain the inflated bag within the confines of the tire during the curing operation.

The rim 10 is constructed of a plurality of arcuate segments 26 hingedly connected together by hinge members 28 and the hinge pin on at least one of the hinges may be removable for permitting the segments to be folded into a collapsed position. Also, lugs are provided which are designated by the numeral 30 for receiving an expanding mechanism for expanding the rim into its circular shape.

The valve stem adjuster 12 incorporates in its construction an elongated slot 32 in the rim disposed along the longitudinal center thereof with there being a block or rectangular member 34 projecting through the slot 32 and having a curved plate 36 rigid with the bottom edge thereof with the plate 36 engaging the inner surface of the rim section 26 and being slidable thereon. The block or rectangular body 34 is provided with an aperture 38 which receives the valve stem 24 whereby the block 34 may slide longitudinally in the slot 32. This will enable the aperture 38 to be easily aligned with the valve stem 24 so that no lateral pressure will exist on the valve stem 34 thereby preventing damage to the curing bag when the curing bag is inflated. As stated previously, if the valve stem is disposed in angular relation due to misalignment between the valve stem and the valve stem opening in the rim, then the valve stem may be torn out of or ripped from the curing bag.

A pair of tension coil springs 40 are connected to the block 34 and extend outwardly therefrom with the outer terminal ends thereof being secured to eye members 42 secured to the inner surface of the rim section 26. The inner ends of the springs 40 are provided with loops 44 which are received over transverse removable pins 46 extending through the block 34 thus enabling disengagement of the springs 40 from the block 34 when desired.

With the present construction, the springs 40 retain the block 34 in a centralized position so that movement of the block 34 in either direction is permitted and assured for positive and accurate alignment of the opening or aperture 38 with the stem 24.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention as claimed.

What is claimed as new is as follows:

1. A rim construction comprising an arcuate member adapted to be engaged with the surface of an inflatable member having a valve stem projecting therefrom, said member including a longitudinal slot therein, a block movable in said slot, said block having an aperture therein for receiving the valve stem wherein the aperture may be aligned with the valve stem, said block having a plate on the inner surface thereof forming a closure for the slot and engaging the rim member peripherally of the slot.

2. The structure as defined in claim 1 wherein spring means interconnects the block and the rim for resiliently urging the block to a centralized position in the slot so that the block may move in either direction for alignment with the stem.

3. The structure as defined in claim 2 wherein said spring means includes a pair of hinged coil springs attached to said block, said springs extending outwardly of said block with the terminal ends being attached to the rim member in spaced relation to the ends of the slot.

4. A curing rim construction comprising an arcuate member adapted to be engaged with a curing bag, said arcuate member having a slot therein for receiving a valve stem extending from the curing bag, a valve stem adjuster comprising an apertured movable block extending through the slot in the rim, said block having a plate on the inner end thereof in sliding engagement with the inner surface of the rim in peripheral relation to the slot for closing the slot, and spring means interconnecting the block and the rim for centralizing the block in the slot and maintaining the block centralized for permitting movement thereof in either direction for alignment with the valve stem.

References Cited in the file of this patent
UNITED STATES PATENTS

| | | |
|---|---|---|
| 1,423,761 | Fairchild | July 25, 1922 |
| 1,866,502 | Iverson | July 5, 1932 |
| 2,018,584 | Watson | Oct. 22, 1935 |